United States Patent
Suarez Montalvo et al.

(10) Patent No.: US 12,077,264 B2
(45) Date of Patent: Sep. 3, 2024

(54) SYSTEM AND METHOD FOR NETWORKED WEATHER SENSING IN OPEN WATER ENVIRONMENTS

(71) Applicant: The Board of Regents of the University of Oklahoma, Norman, OK (US)

(72) Inventors: Hernan A. Suarez Montalvo, Norman, OK (US); Yih-Ru Huang, Norman, OK (US); Yan Zhang, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 942 days.

(21) Appl. No.: 16/975,354

(22) PCT Filed: Apr. 12, 2019

(86) PCT No.: PCT/US2019/027342
§ 371 (c)(1),
(2) Date: Aug. 24, 2020

(87) PCT Pub. No.: WO2019/200331
PCT Pub. Date: Oct. 17, 2019

(65) Prior Publication Data
US 2021/0031885 A1    Feb. 4, 2021

Related U.S. Application Data

(60) Provisional application No. 62/657,462, filed on Apr. 13, 2018.

(51) Int. Cl.
*B63B 49/00* (2006.01)
*B60L 8/00* (2006.01)
(Continued)

(52) U.S. Cl.
CPC .............. *B63B 49/00* (2013.01); *B60L 8/003* (2013.01); *B60L 2240/70* (2013.01); *B63B 35/00* (2013.01);
(Continued)

(58) Field of Classification Search
CPC ... B63B 49/00; B63B 35/00; B63B 2035/008; B63B 2035/007; B63B 2211/02;
(Continued)

(56) References Cited

U.S. PATENT DOCUMENTS 5,878,685 A    3/1999  Hemphill et al.
6,536,272 B1 *  3/2003  Houston .................. G01N 1/12
                                                  73/170.29
(Continued)

FOREIGN PATENT DOCUMENTS

CN    204776009 U  * 11/2015
WO    2016179637 A1   11/2016

OTHER PUBLICATIONS

English Translation CN204776009U (Year: 2023).*
(Continued)

*Primary Examiner* — Rami Khatib
(74) *Attorney, Agent, or Firm* — Conley Rose, P.C.; Grant Rodolph; Jonathan K. Polk (57) ABSTRACT

A USV comprises a buoyant hull structure; an MCU coupled to the buoyant hull structure; a VHF radio coupled to the buoyant hull structure; a satellite radio coupled to the buoyant hull structure; a GPS coupled to the buoyant hull structure; a plurality of weather sensors coupled to the buoyant hull structure; a navigation and propulsion controller coupled to the buoyant hull structure; at least one thruster coupled to the buoyant hull structure and configured to provide propulsion; a battery coupled to the buoyant hull structure; a charge controller coupled to the buoyant hull (Continued)

structure; and a solar panel coupled to the buoyant hull structure and configured to charge the battery.

8 Claims, 9 Drawing Sheets

(51) Int. Cl.
  *B63B 35/00* (2020.01)
  *B63G 8/00* (2006.01)
  *G05D 1/00* (2024.01)
(52) U.S. Cl.
  CPC .. *B63B 2035/008* (2013.01); *B63G 2008/004* (2013.01); *G05D 1/0206* (2013.01)
(58) Field of Classification Search
  CPC .. B60L 8/003; B60L 2240/70; B60L 2200/32; B60L 2260/32; B60L 50/60; B63G 2008/004; G05D 1/0206; G08G 3/02; Y02T 10/70; Y02T 10/7072; Y02T 10/72; Y02T 90/16
  See application file for complete search history.

(56) References Cited

U.S. PATENT DOCUMENTS

| | | | |
|---|---|---|---|
| 9,096,106 B2* | 8/2015 | Hanson | B60F 5/00 |
| 2014/0316657 A1 | 10/2014 | Johnson et al. | |
| 2015/0027125 A1* | 1/2015 | Raj | F03D 1/0616 60/720 |
| 2015/0304026 A1 | 10/2015 | DeVaul et al. | |
| 2016/0041255 A1 | 2/2016 | Berumen et al. | |
| 2016/0125739 A1 | 5/2016 | Stewart et al. | |
| 2016/0280348 A1 | 9/2016 | Jenkins et al. | |
| 2017/0291670 A1 | 10/2017 | Johnson | |
| 2017/0328345 A1* | 11/2017 | Grober | G01P 5/00 |
| 2018/0157255 A1* | 6/2018 | Halverson | G07C 5/0808 |
| 2020/0385093 A1* | 12/2020 | Gordon | G05D 1/101 |

OTHER PUBLICATIONS

European Supplementary Search Report; Application No. 19785665.1; Nov. 9, 2021; 9 pages.
Bhardwaj, Manish, et al.; "Upper Bounds on the Lifetime of Sensor Networks"; IEEE Conference on Communications; 2001; 6 pages.
Boukerche, Azzedine, et al.; "Routing Protocols in Ad Hoc Networks: A Survey"; Computer Networks; vol. 55; Sep. 15, 2011; 66 pages.
Commuri, S., et al.; "System Intelligence Requires Distributed Learning"; Proceedings of the 2004 IEEE International Symposium on Intelligent Control; Taipei, Taiwan; Sep. 2-4, 2004; 6 pages.
Dawson II, Daniel T., et al.; "Sensitivity of Real-Data Simulations of the May 3, 1999 Oklahoma City Tornadic Supercell and Associated Tornadoes to Multimoment Microphysics. Part II: Analysis of Buoyancy and Dynamic Pressure Forces in Simulated Tornado-Like Vortices"; Journal of the Atmospheric Sciences; vol. 73; Mar. 2016; 23 pages.
Eskridge, Brent E., et al.; "State and Action Abstraction in the Development of Agent Controllers"; Autonomous Agents; IntechOpen; Jun. 1, 2020; 28 pages.
Fleming, L. E., et al.; "Oceans and Human Health: Emerging Public Health Risks n the Marine Environment"; Marine Pollution Bulletin; vol. 53; 2006; 24 pages.
Gao, Jidong, et al.; "Storm-Scale Radar Data Assimilation and High Resolution NWP"; Hindawi Publishing Corporation; Advances in Meteorology; vol. 2014; 2014; 4 pages.
Heinzelman, Wendi Rabiner, et al.; "Energy-Efficient Communication Protocol for Wireless Microsensor Networks"; Proceedings of the 33rd Hawaii International Conference on System Sciences; 2000; 10 pages.
Hu, Wen, et al.; "A Communication Paradigm for Hybrid Sensor/Actuator Networks"; International Journal of Wireless Information Networks; vol. 12, No. 1; Jan. 2005; 13 pages.
Intanagonwiwat, Chalermek, et al.; "Directed Diffusion for Wireless Sensor Networking"; IEEE/ACM Transactions on Networking; vol. 11, No. 1; Feb. 2003; 15 pages.
Johnson, David B., et al.; "Dynamic Source Routing in Ad Hoc Wireless Networks"; Mobile Computing; 1996; 18 pages.
Lampitt, R. S., et al.; "In Situ Sustained Eulerian Observatories"; Proceedings of the OceanObs'09: Sustained Ocean; Dec. 2010; 10 pages.
Lenzi, Nicholas, et al.; "DCF—A JAUS and TENA Compliant Agent-based Framework for UAS Performance Evaluation"; Proceedings of the 10th Performance Metrics for Intelligent Systems Workshop; Baltimore, Maryland; 2010; 8 pages.
Li, Fan, et al.; "Routing in Vehicular Ad Hoc Networks: A Survey"; IEEE Vehicular Technology Magazine; Jun. 2007; 11 pages.
Lomas, M. W., et al.; "Two Decades and Counting: 24-years of Sustained Open Ocean Biogeochemical Measurements in the Sargasso Sea"; Deep-Sea Research II; vol. 93; 2013; 17 pages.
Madden, Samuel, et al.; "TAG: a Tiny AGregation Service for Ad-Hoc Sensor Networks"; 5th Annual Symposium on Operating Systems Design and Implementation (OSDI); Dec. 2002; 16 pages.
McClure, Mark, et al.; "The DARPA LANdriods Program"; Proc. of SPIE; vol. 7332; 2009; 10 pages.
McPherson, Renee A., et al.; "Statewide Monitoring of the Mesoscale Environment: A Technical Update on the Oklahoma Mesonet"; Journal of Atmospheric and Oceanic Technology; vol. 24; Mar. 2007; 21 pages.
Meguerdichian, Seapahn, et al.; "Localized Algorithms In Wireless Ad-Hoc Networks: Location Discovery And Sensor Exposure"; Proceedings of the 2nd ACM International Symposium on Mobile Ad Hoc Networking and Computing; Long Beach, California; 2001; 11 pages.
NSF Award Search: Award #0802888; "VORTEX2: A Study of Tornado and Tornadic Thunderstorm Dynamics through High-Resolution Simulation, Advanced Data Assimilation and Prediction"; https://nsf.gov/awardsearch/showAward?AWD_ID=0802888; Mar. 3, 2011; 4 pages.
Parker, L. E., et al.; "Distributed Autonomous Robotic Systems—Chapter 7: Autonomous Mobile Robots and Distributed Exploratory Missions"; 2000; Part 1; pp. 1-240.
Perkins, Charles E., et al.; "Ad-hoc On-Demand Distance Vector Routing"; Proceedings of the 2nd IEEE Workshops on Mobile Computing Systems and Applications; New Orleans, Louisiana; 1999; 11 pages.
Raghunathan, Vijay, et al.; "Energy-Aware Wireless Microsensor Networks; IEEE Signal Processing Magazine; Mar. 2002; 11 pages.
Stoeter, Sascha A., et al.; "A Robot Team for Surveillance Tasks: Design and Architecture"; Robotics and Autonomous Systems; vol. 40; 2002; 11 pages.
Webb, Douglas C., et al.; "SLOCUM: An Underwater Glider Propelled by Environmental Energy"; IEEE Journal of Oceanic Engineering; vol. 26, No. 4; Oct. 2001; 6 pages.
Ye, Fan, et al.; "A Two-Tier Data Dissemination Model for Large-scale Wireless Sensor Networks"; Proceedings of the 8th Annual International Conferences on Mobile Computing and Networking; Atlanta, Georgia; 2002; 12 pages.
PCT International Search Report; Application No. PCT/US2019/027342; Jun. 27, 2019; 3 pages.
PCT Written Opinion of the International Searching Authority; Application No. PCT/US2019/027342; Jun. 27, 2019; 8 pages.
Parker, L. E., et al.; "Distributed Autonomous Robotic Systems—Chapter 7: Autonomous Mobile Robots and Distributed Exploratory Missions"; 2000; Part 2; pp. 241-486.

* cited by examiner

SYSTEM AND METHOD FOR NETWORKED WEATHER SENSING IN OPEN WATER ENVIRONMENTS

CROSS-REFERENCE TO RELATED APPLICATIONS

This application claims priority to U.S. provisional patent application No. 62/657,462 filed on Apr. 13, 2018 by Hernan Suarez, et al., which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Accurate measurements of meteorological conditions in the ocean-atmospheric boundary layer are critical for many applications such as hurricane/typhoon forecast, climate monitoring, oceanography, resource surveying, spill prevention, spill recovery and Navy system operation. Atmospheric-condition data are collected either with in-situ measurements (such as dropsondes or weather balloons) or remote sensors (such as radar), and the follow-up data assimilation will process these sensor data into numerical weather prediction (NWP) models. The collection of these measurements poses significant challenges in terms of cost, time, and instrumentation. An important challenge for the data assimilation is the spatial and temporal resolution limitations of existing data-collection schemes and the availability of three-dimensional wind measurements near the ocean surface (which is very important for precise near-surface atmosphere and atmosphere-water boundary modeling). Ideally, the sensors would be deployed "on-demand" in the zone of interest at the resolution required for the situation, but in reality this is difficult. Recently, autonomous devices such as unmanned undersea vehicles (UUVs) and unmanned surface vehicles (USVs) have been used to demonstrate the capability of robotic technology to automate and facilitate the collection of marine data. The ability to collect large amounts of atmospheric boundary-layer data, such as wind speed and direction, temperature, pressure, and humidity, in a cost-effective manner by using an unmanned platform and advanced robotics technology could produce rich datasets with a high degree of usability. However, existing systems, such as satellite-communication-based gliders, are limited in either flexibility or scalability, partially due to prohibitively high costs.

There are several key challenges and obstacles to successfully deploying the technological capability of autonomous systems. First, an unmanned sensor platform must remain stable and autonomous, maintaining a designated position at one or more waypoints, even under challenging sea conditions. Second, data transmission from the sensor platform to analysts and scientists must be reliable. Existing Ad Hoc On Demand Distance Vector (AODV) networking algorithms and products need to be improved to support deterministic, more reliable and real-time data delivery in a large-scale network under more channel uncertainties. A third challenge with unmanned technology is the support of better spatial and temporal resolution with a network scheme. Finally, as with any research program, there are technical risks and financial costs associated with development and deployment. It is to overcoming these obstacles and challenges that the technology of the present disclosure is directed, as explained below.

BRIEF DESCRIPTION OF THE DRAWINGS

Several embodiments of the present disclosure are hereby illustrated in the appended drawings. It is to be noted however, that the appended drawings only illustrate several embodiments and are therefore not intended to be considered limiting of the scope of the present disclosure.

DETAILED DESCRIPTION

The present disclosure is directed to a new intelligent network system which includes unmanned surface vehicles (USVs) comprising sensor-bearing platforms to support off-shore atmospheric observations, and is referenced herein as Distributed Autonomous Meteorological Stations (DAMES). The systems merges a sensing network with marine surface robot platforms to achieve "group cognitive" capabilities, reduce costs, and enable remote monitoring and quick remote data acquisition from one or multiple sensor systems over wide areas of coverage. With this system, a large set of meteorological sensor nodes can be quickly deployed in the monitoring field, where each sensor independently senses and detects the environmental parameters, but they collaboratively perform data aggregation, statistical analysis, and complex signal processing to support environmental monitoring and management. A wireless backbone of the system, along with the low-level sensing network provides the capabilities of distributed and collaborative environmental monitoring and management. Compared with existing sensor-network technologies, DAMES is extremely scalable and resource efficient. Also, it provides quick information feedback to large sensor systems.

Particular innovations and benefits of the disclosed system and method include, but are not limited to, (1) improved spatial and temporal resolution, (2) integration of sensing, communication, and control, (3) networking capability, (4) scalability, (5) adaptability and extensibility, (6) resource efficiency, (7) small, low-cost, and smarter surface vehicles, (8) composite hull structure and boat body, and (9) a state of the art wire control system. These and other innovations, benefits, and advantages are described in further detail below.

Before describing various embodiments of the embodiments of the present disclosure in more detail by way of exemplary description, examples, and results, it is to be understood that the embodiments of the present disclosure are not limited in application to the details of methods and apparatus as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that certain embodiments of the present disclosure can be practiced without these specific details. In other instances, features which are well known to persons of ordinary skill in the art have not been described in detail to avoid unnecessary complication of the description.

Unless otherwise defined herein, scientific and technical terms used in connection with the embodiments of the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which embodiments of the present disclosure pertain. All patents, published patent applications, and non-patent publications referenced in any portion of this application are herein expressly incorporated by reference in their entirety to the same extent as if each individual patent or publication was specifically and individually indicated to be incorporated by reference.

While the methods and apparatus of the embodiments of the present disclosure have been described in terms of particular embodiments, it will be apparent to those of skill in the art that variations may be applied to the thereto and in the steps or in the sequence of steps of the methods described herein without departing from the spirit and scope of the inventive concepts. All such similar substitutes and modifications apparent to those of skilled in the art are deemed to be within the spirit and scope of the systems as defined herein.

As utilized in accordance with the methods and apparatus of the embodiments of the present disclosure, the following terms, unless otherwise indicated, shall be understood to have the following meanings.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" or "approximately" is used to indicate that a value includes the inherent variation of error. Further, in this detailed description, each numerical value (e.g., time or frequency) should be read once as modified by the term "about" (unless already expressly so modified), and then read again as not so modified unless otherwise indicated in context. The use of the term "about" or "approximately" may mean a range including 1%, or 55%, or 10%, or 15%, or 25% of the subsequent number unless otherwise stated.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

Features of any of the embodiments described herein may be combined with any of the other embodiments to create a new embodiment. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Thus, to further illustrate reference to a series of ranges, for example, a range of 1-1,000 includes, for example, 1-10, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 100 units to 2000 units therefore refers to and includes all values or ranges of values of the units, and fractions of the values of the units and integers within said range, including for example, but not limited to 100 units to 1000 units, 100 units to 500 units, 200 units to 1000 units, 300 units to 1500 units, 400 units to 2000 units, 500 units to 2000 units, 500 units to 1000 units, 250 units to 1750 units, 250 units to 1200 units, 750 units to 2000 units, 150 units to 1500 units, 100 units to 1250 units, and 800 units to 1200 units. Any two values within the range of about 100 units to about 2000 units therefore can be used to set the lower and upper boundaries of a range in accordance with the embodiments of the present disclosure.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), and application specific integrated circuit (ASIC), field programmable gate array (FPGA), a combination of hardware and software, and/or the like. The term "processor" as used herein means a single processor or multiple processors working independently or together to collectively perform a task.

Returning now to the description of the various embodiments, the innovations, benefits, and advantages of the presently disclosed DAMES system and method, as noted above, including but not limited to, (1) improved spatial and temporal resolution, (2) integration of sensing, communication, and control, (3) networking capability, (4) scalability, (5) adaptability and extensibility, (6) resource efficiency, (7) small, low-cost, and smarter surface vehicles, (8) composite hull structure and boat body, and (9) a state of the art wire control system, are now described in further detail.

Spatial and Temporal Resolution

The conventional numerical atmospheric models and electromagnetic propagation models that use collected ocean-sensor data are facing new challenges that involve smaller-scale and rapidly evolving atmospheric conditions, including, but not limited to the following: wind conditions; evolving refractivity profiles; cloud and microphysical properties; the location, intensity and duration of mesoscale convergence lines, heavy rain and snow bands; and localized gust fronts and squalls. Studies of fine-scale ocean weather affecting ship operation can be undertaken by combining sensor data sampled from different locations at different times and assimilating them into a model along with larger scale forecast data. A single stand-alone USV cannot provide sufficient spatial or temporal resolutions to address these challenges. Only a distributed/asynchronous atmospheric sensor networking scheme, such as DAMES, can. The DAMES system enables multiple low-cost platforms and sensor nodes to be wirelessly coordinated by dynamically deploying the USVs in optimal geographic locations, enabling a more reliable, accurate, and robust sampling of the atmosphere providing the necessary spatial and temporal resolution.

Integration of Sensing, Communication, and Control

The USVs of the presently disclosed system, in addition to having weather sensors, can also be equipped to have autonomous navigation capability. In this embodiment, the USV fleet has the ability to form a dynamic mesh network specially designed for the mesoscale marine environment, thereby allowing all nodes to transmit sensor data back to a base station located on shore or on a host ship, where quality control, analysis, and display of the data are performed. As a network, the sensor location grid can be updated based on the need of sampling-region coverage, such that data with ideal spatial resolution can be obtained for strategically important areas. Also, the individual vessel can obtain the information from other boats to determine its own action, which can be executed through an Agent-based Distributed Control Framework used by the team of operators of the DAMES system. In one embodiment of a multiple-sensor package option for the boat platform, one of the sensors is a small, low-power radio frequency (RF)-RADAR sensor similar to the RF transponder used in unmanned aerial vehicles. This sensor can be used, for example, for collision avoidance in the ocean-traffic area. Meanwhile, the USV platform design is a fully reconfigurable system platform to allow the exploration of different communication options such as satellite, and different energy-harvesting technologies such as wind power (e.g., in a sail-boat option). At the network level, based on survey requirements, upon deployment, the system can collaboratively and automatically regroup in strategic areas (such as areas with oil spills or water-temperature changes) to collect higher-resolution data based on communication commands.

Networking Capability

In one non-limiting embodiment, the networking architecture of DAMES can be based on modifying and improving an existing DigiMesh implementation (Digi International Corp.). The terrestrial DigiMesh technology is able to send data packets within a radius of 20 miles in the presence of urban clutters. It also supports a faster data throughput rate than existing radio solutions and implements a network self-healing capability to take into account time-varying and uncertain communication channels in the ocean. On the other hand, this solution has some disadvantages, including: (1) Fundamentally, a full-mesh network topology is unnecessary for vast ocean surveillance, since most nodes only need to communicate with their nearest neighbors. (2) The implementation of the Ad hoc On Demand Distance Vector (AODV) (e.g., see A. Boukerche, B. Turgut, N. Aydin, M. Z. Ahmad, L. Bölöni, and D. Turgut, "Routing protocols in ad hoc networks: A survey," Computer Networks, vol. 55, pp. 3032-3080, Sep. 15, 2011, and Charles E. Perkins and Elizabeth M. Royer, "Ad hoc On-Demand Distance Vector Routing," in Proceedings of the 2nd IEEE Workshop on Mobile Computing Systems and Applications, New Orleans, L A, 1999, pp. 90-100) routing algorithm on DigiMesh has an impact on the network bandwidth efficiency (some tests show about 70% bandwidth overhead). (3) The maximum effective radio range is reduced from 40 miles (point to point) to about 20 miles due to the mesh-networking protocol. (4) Time synchronization at the medium access control (MAC) Layer is designed for avoiding messaging collision and energy saving, while it requires an accurate number of nodes joined to a certain network. In the marine environment, it is anticipated that nodes will join/leave networks frequently. (5) The existing protocol is not able to fully use the GPS-location and signal-strength information in data routing, while for the ocean environment, that is useful. Therefore, the presently disclosed system optionally utilizes a wireless-sensor network protocol designed for a marine-observation environment. It has more "intelligence" as described elsewhere herein, while also being more robust to handle the uncertain and time-varying channels pertaining to the applications needed for the present system.

Scalability

The novel tiered sensor network architecture of the presently disclosed system is highly scalable to the number of sensor nodes in the network, and this is the first time that such architecture has been used for marine weather observations. As the cost of the system is relatively low, it is feasible to deploy a larger number of sensor systems to cover a large area of open water such as an ocean, sea, or lake. DAMES addresses the scalability challenges by applying the divide-and-conquer principle to organize the sensor nodes into a two-level hierarchy architecture. In at least one embodiment, the higher tier (or backbone network) uses the Iridium satellite radio network for global coverage, and the lower-tier uses long range radio transceivers (such as, but not limited to, 900 megahertz (MHz)) to achieve peer-to-peer networking. Based on the dynamic environments, the lower-tier nodes can join or leave the "subnets" of the higher tier networks.

Adaptability and Extensibility

Open water (e.g., ocean) monitoring activities may be composed of multiple sensor systems distributed over several remote regions, and these monitoring activities are enabled by a wide variety of sensors, such as meteorological, oceanographic, chemical, optical, RF, bio-sensors and so on. To support remote data acquisition and remote monitoring, a sensor-network system should have the capabilities of networking between multiple sensor systems and interfacing with existing and future sensor systems. DAMES includes a backbone layer, which provides the support for integrating multiple sensor networks. If further combined with satellite communication, the backbone network can integrate various data processing centers and facilities. Also, the backbone nodes utilize a modular design to enable them to plug and play with future upgrades.

Resource Efficiency

The overall system is constructed with efficient power-management solutions including battery control, propulsion/navigation, and communication. The disclosed embodiments may focus on energy and bandwidth efficiency of the sensor network. The limited amount of energy at each node must support multiple functions, including sensing, on-board signal processing, and communication. However, some resource-intensive algorithms and tasks, such as statistical analysis, intelligent decision-making, and distributed swarm formation, may not be feasible to all the sensor nodes due to limited power. Moreover, this stringent resource issue also indicates a low bandwidth supply. Passing all the information from every sensor node to the far-off centralized monitoring station results in a significant transmission delay, which may not be possible for a large-sized distributed system. To further fulfill the bandwidth requirement, a number of redundant activities are reduced if not eliminated, and the high-bandwidth, time-series data are preprocessed through an efficient information fusion model. For example, DigiMesh is a good low-power network. However, efficient power management leads to longer latency and non-deterministic behaviors. The DAMES system of the present disclosure offers resource efficiency by avoiding the implementation of advanced algorithms on all the sensor nodes. Moreover, local signal pre-processing further reduces the amount of redundant information transmitted through the network to meet the requirement of bandwidth efficiency.

Small, Low-Cost, and Smarter Surface Vehicles

In certain embodiments, the USV of the DAMES system has an average mass-manufacturing cost of approximately $3,500. This low cost means that 10-100 USVs could be deployed for the same cost as a typical single, large, expensive USV platform currently on the market, while DAMES allows larger open-water coverage with better spatial resolution. The USV platform is powered by solar panels and has the capability to self-sustain in one open-water location without requiring anchoring or other energy-requiring methods.

Composite Hull Structure and Boat Body

In at least one non-limiting embodiment, the main chassis of the USV is built on a very strong aluminum frame (skeleton) and surrounded by a "skin" of EVA (ethylene vinyl acetate) foam to provide floating availability and durability. This novel unitary composite boat body design enables the USV to survive adverse weather and potential impact conditions.

State of the Art Wire Control System

The USV has many sensors on board and, in certain embodiments, one or more of the sensors can provide altitude information of the USV as well. A Microcontroller Unit (MCU) of the USV could then form a proportional-integral-derivative (PID) controller with sensor feedback to provide any condition heading control. In certain embodiments, any change of physical boat body or thrust power can be responded to by the wire control to keep the USV heading in the right direction without need of calibration.

The embodiments of the present disclosure, having now been generally described, will be more readily understood by reference to the following examples, which are included merely for purposes of illustration of certain aspects and embodiments of the presently disclosed inventive concepts, and are not intended to be limiting. Without further elaboration, it is believed that one skilled in the art can, using the present description, practice the components, systems, and methods of the present disclosure to the fullest extent. Those skilled in the art will promptly recognize appropriate variations from the embodiments described herein which fall within the inventive concepts disclosed herein.

Examples

Figure 1:
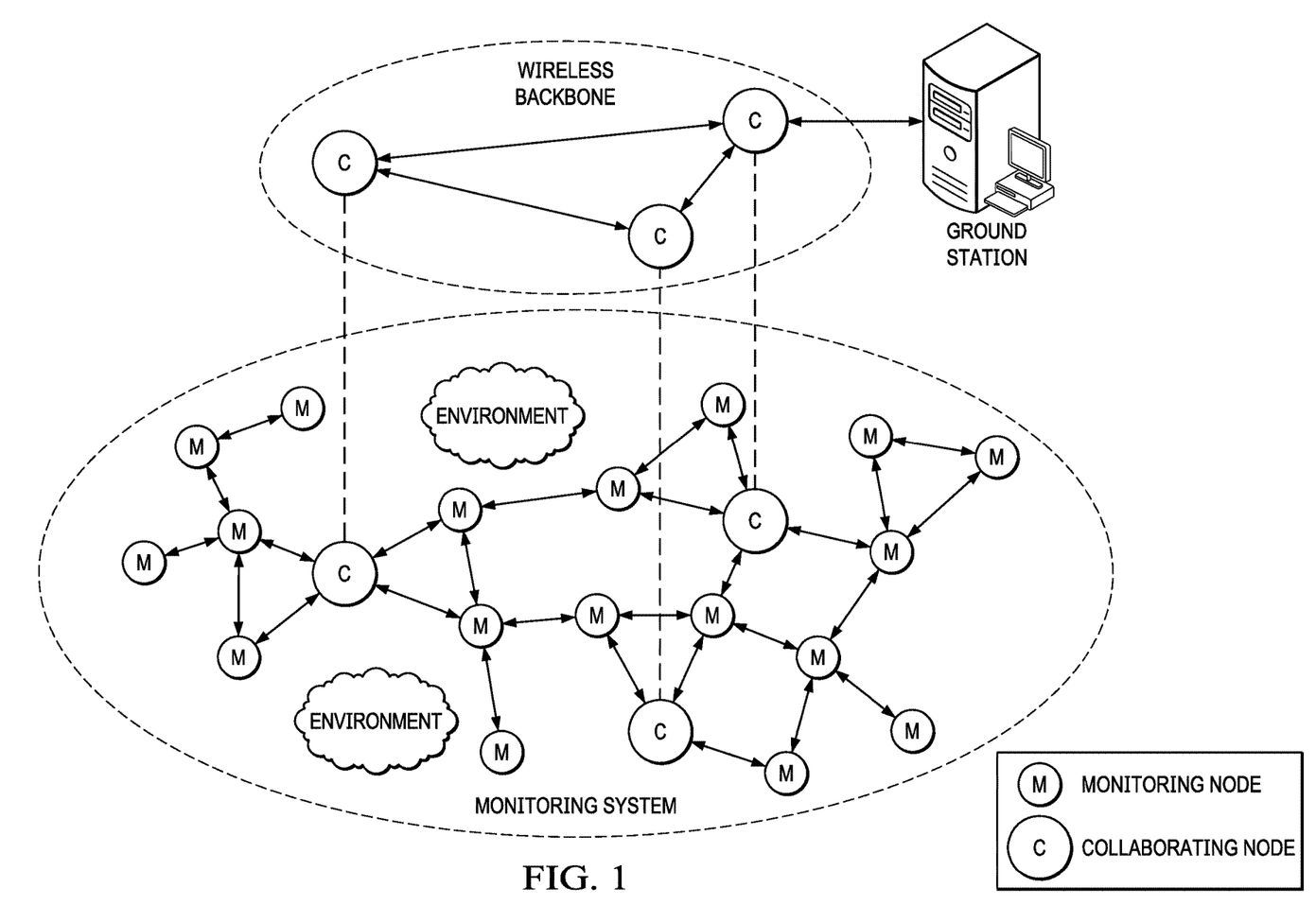
FIG. 1 is a schematic of an overview of the system architecture of the present disclosure.

In certain embodiments, the DAMES system of the present disclosure utilizes a group of marine USVs and sensor networks connecting them with a remote (e.g., ground) monitoring station (FIG. 1). The formation, separation and active/inactive modes of the group are self-configured based on weather surveillance tasks, and the sensor data is delivered to the ground station based on wireless radio links. The sensors measure temperature, humidity, wind speed/direction, dew point, water temperature, and air pressure, and any other useful parameters, and send the data at high temporal and spatial resolutions. The system provides a new open-water-sensing solution at a lower cost and with better data quality and automation than existing systems.

Sensor Network

DAMES is a hybrid sensor network comprising both resource-rich and resource-impoverished sensor nodes, which may be USVs. The resource-impoverished sensors run as "monitoring" nodes for basic parameter measurements, and the resource-rich sensors as "collaborating" nodes for resource-intensive tasks. The sensor nodes are organized into a two-level hierarchy in which the "monitoring" nodes are in the bottom level performing the basic sensing operations and the "collaborating" nodes are in the top level as backbone nodes. By exploiting resource-rich devices, the communication burden on smaller, energy, bandwidth, memory and computation-constrained-monitoring sensor devices is reduced. The backbone nodes automatically form a backbone network to support long-range, high-speed information delivery and persistent data storage. Users at the remote centralized monitoring station can utilize the information provided to further construct an ever-evolving field histogram. Two types of software agents are implemented: a local monitoring agent and a collaborative signal processing (CSP) agent. The local monitoring agent on "monitoring" sensor nodes collects local information from individual sensing modalities and performs local data processing, and the CSP agent on backbone nodes collaborates with "monitoring" nodes to perform CSP and transmit information to remote monitoring stations through a multi-hop backbone network. Software agents can support an adaptive network load that balances automatically without the need for much redesign. It can be programmed to carry different task-specific integration processes, which extend the functionality of the network.

Collaborative Sensing Performance and Signal Processing (CSPs)

The purpose of the deployed wireless sensor network is to provide remote users with the capabilities of viewing the monitoring field from multiple aspects and making decisions based on CSP. No matter what sensor types are used in the network, the first step of CSP is feature extraction and selection of a local time series. As mentioned earlier, signal-processing algorithms operating on a single node's data may not provide a complete view of an associated event, which limits their performance. CSP is able to perform comprehensive analysis based on information provided by multiple sensor nodes or multiple sensing modalities. The challenge is how to obtain the most meaningful information from the data collected by the distributed nodes in an efficient and robust manner. To aggregate such, diverse types of data and collaboration techniques may be required, both within a sensor node and across nodes.

Intra-Sensor Multiple Modality Collaboration

Each system node may be connected to several sensors of the same or different modalities. Multimodal collaboration aims to aggregate such data optimally to improve the overall sensing performance. This type of CSP combines the information across different sensing modalities at the same "monitoring" node and thus does not require wireless communication among them. A data-fusion approach based on a concatenated, high-dimensional feature vector may be applicable for this type of CSP processing. Another form of collaboration is to extract data from a number of sensor nodes using the same sensing modality. Given the limited sensing times at a given node and possible interference effects, more reliable information on the feature of a target event could be obtained by sharing data across nodes. This type of CSP involves a higher communication burden, since data or decisions from multiple nodes are transmitted.

Information Delivery

To enable the CSP for resource-rich "collaborating" nodes in the disclosed hybrid sensor architecture, an efficient mechanism to route the sensor data to the nearest "collaborating" node is used. Most existing routing protocols for sensor networks have not been designed to leverage the capabilities of hybrid architecture. It should also be noted that the backbone nodes may not be fixed. The mobile backbone nodes make the schemes of assigning a fixed backbone node for each monitoring node infeasible. In at least one embodiment, the present system uses a shared, tree-based Anycast mechanism (e.g., see H. Wen, et al., "A communication paradigm for hybrid sensor/actuator networks," in 2004 IEEE 15th International Symposium on Personal, Indoor and Mobile Radio Communications (IEEE Cat. No. 04TH8754), 2004, pp. 201-205 Vol. 1). Corresponding to each sensor information source, a shortest-path tree rooted at the node is constructed. Backbone nodes form the leaves of the tree. Backbone nodes can dynamically join or leave the tree. Data are delivered to the nearest backbone node on the tree. The tree-formation process can be described as follows: Every sensor node forms a potential event source. Therefore, corresponding to every sensor node "i" in the network, there is an Anycast tree "Ti" rooted at that sensor node. When a "collaborating" backbone node enters the network, a new branch leading to the backbone node must be added to each Anycast tree. To calculate the cost of the branch, the backbone node initializes a cost field c (e.g., hop count) in the route-discovery packet. Upon receiving this packet from backbone node S, each node i updates its Anycast table by setting cost c (i; S) of the branch from S to c. The cost c is incremented before packet forwarding. Eventually, a new branch (with cost) to backbone node S is added to each tree. The approach handles exit of mobile backbone nodes by setting up a timer, and an entry is deleted when the timer expires. After initial set-up, when a data packet arrives, a sensor looks up its Anycast table for the backbone node with minimum cost before it forwards the packet. Therefore, the packet will be sent to only the nearest backbone node. This shared-tree-based Anycast mechanism is a good approach to handling dynamics, as it simultaneously maintains paths to all backbone nodes.

System Software

Figure 2:
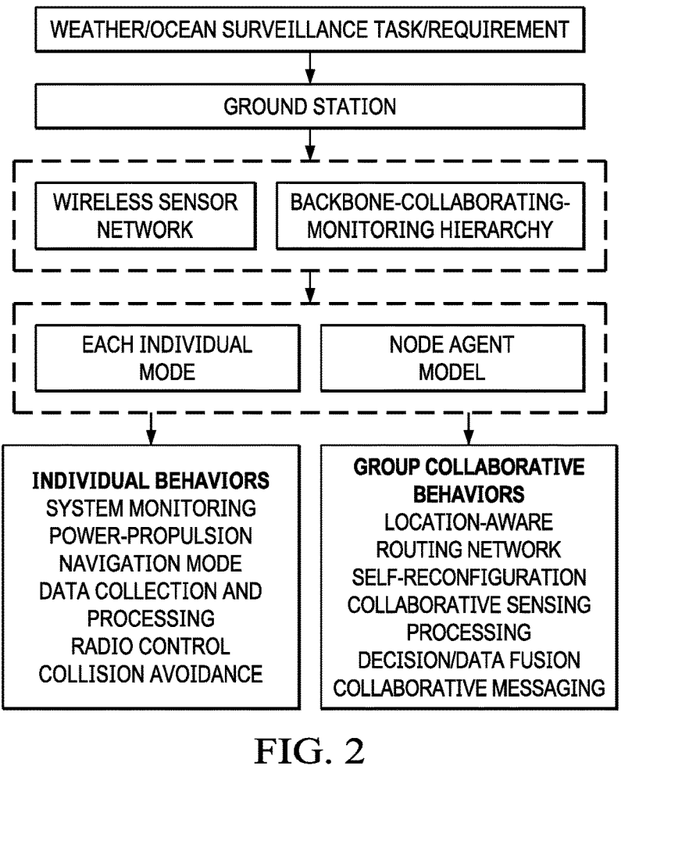
FIG. 2 depicts a general software architecture of the disclosed system.

The overall intelligent software architecture for one embodiment of the DAMES system is depicted in FIG. 2. In this architecture, we distinctly outline the "individual behavior," which is related to the operation of each individual boat/node, and "group collaborative behavior," which addresses all the communication protocols, collaborative sensing, and processing and decision fusion. The software contains implementation of a customized PID control algorithm that controls an individual USV's thrusters and power/energy control algorithms. All the parts of the software are integrated in the embedded codes in the MCU, which runs on a custom-designed printed circuit board (PCB) card. The roles taken for each individual node and the "tasks" for the overall observation mission are issued by a meteorology team through a ground station, initially analyzed in the backbone nodes. They are then sent to the monitoring/collaborating nodes.

System Testbeds

Radio and Network Testbed

Figure 3:
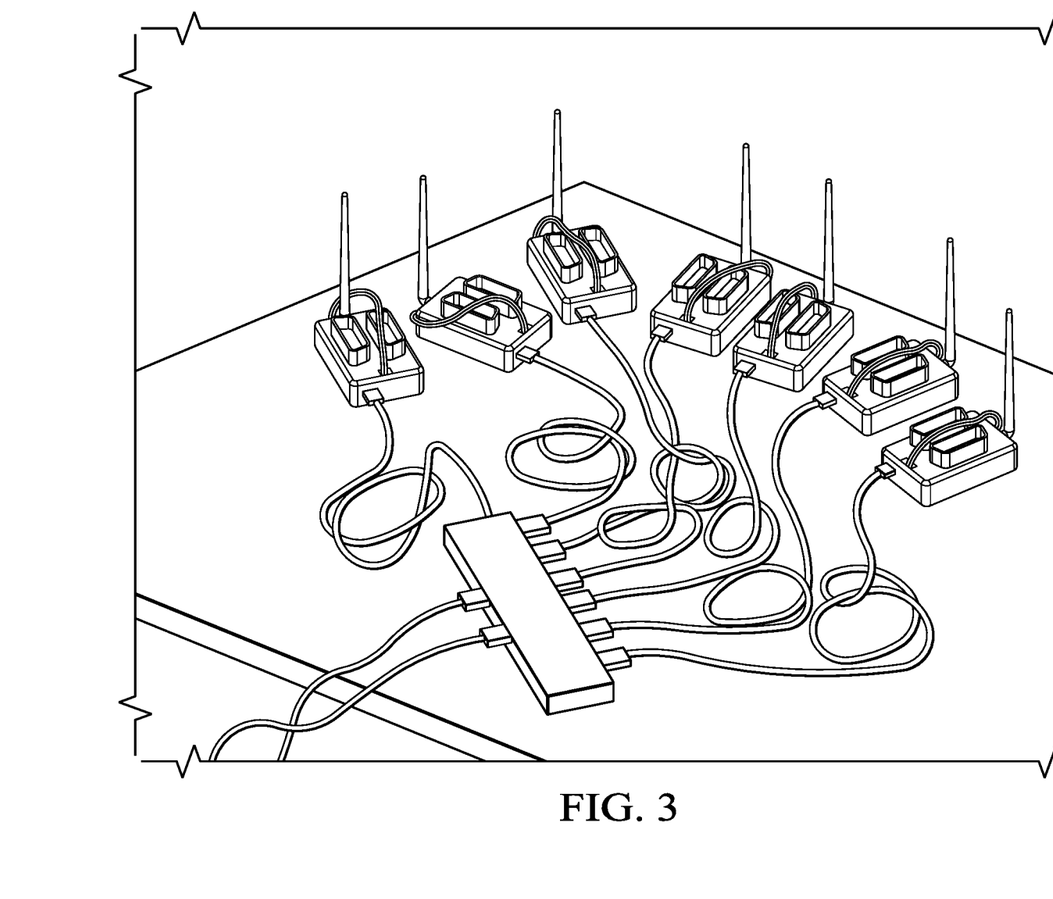
FIG. 3 is a photograph of a "cluster" of network nodes for the sensor network scheme disclosed herein.

In certain embodiments, a mixed very high frequency (VHF) 900 MHz radio testbed is used for protocol development and validations. The nodes are organized into clusters, and a photo of such a cluster is shown in FIG. 3. A customized user interface is available to include data visualization and tracking, platform location and status tracking, radio-link status and database.

Sensor and Data Collection Testbed

Figure 4:
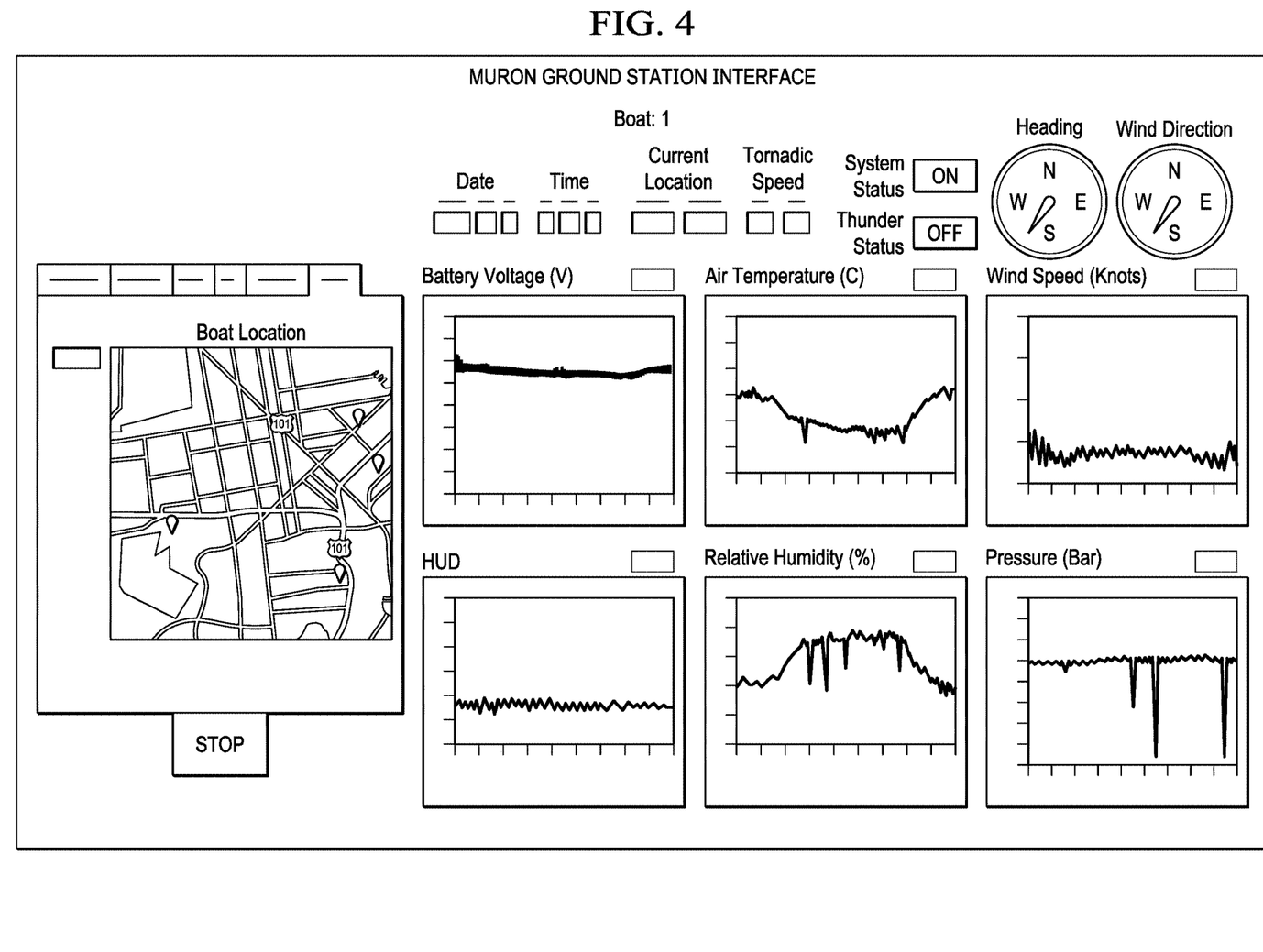
FIG. 4 is a photograph of a graphic user interface which shows a data display at a ground station for the system of the present disclosure.

The base station, which may be the ground station in FIG. 1, is an important element of the networked sensing system. In one non-limiting embodiment, the base station runs a user interface that displays weather data and boat location on a satellite map. FIG. 4 shows part of a ground station graphical user interface (GUI) that may be used for configuring the networking modes. In certain embodiments, the ground station GUI has the comprehensive interfaces to communicate with all the remote USVs to collect weather and other sensor data at intervals of less than one second.

Robotic Marine Platform

Figure 5:
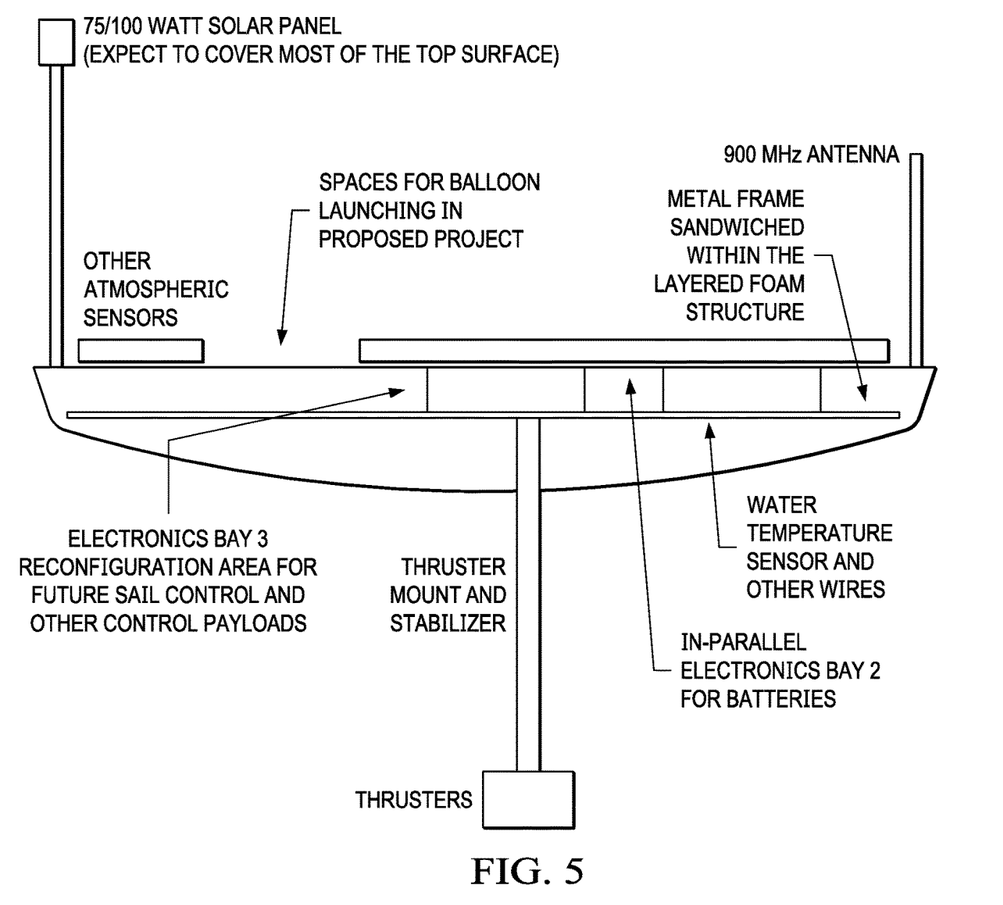
FIG. 5 is a cross-sectional schematic of one embodiment of an unmanned surface vehicle (USV) constructed for use as a component of the presently disclosed system.

In certain embodiments, the USV of the DAMES system of the present disclosure includes an improved navigation autonomy, the ability to launch a radiosonde balloon, and a mesh communication network. In one embodiment, components of the USV and DAMES system, which may be a monitoring node in FIG. 1, are shown in FIG. 5 and may include, but are not limited, to a hull structure, a master computer unit (MCU), 900 MHz radio, satellite radio, a Global Positioning System (GPS), weather sensors, an optional balloon and radiosonde controller, a navigation and propulsion controller, one or more (e.g., two) thrusters, a battery and charge controller, a solar panel, and an optional collision avoidance sensor (CAS), as described in further detail below.

Hull Structure

The hull structure has been custom-designed and verified through fluid dynamics simulations. The EVA foam material used for the hull structure support is impact absorbing and UV resistant for long term operations. The hull structure is manufactured to combine layered composition, simple molding, and 3D printing to allow for low-cost manufacturing.

Master Computer Unit

An on-board computer processor controls all sub-systems, modules, and sensors. The MCU monitors the power state, logs sensor measurements to memory, coordinates control of the platform mobility, and commands deployment of the radiosonde balloon.

VHF Radio

A VHF radio system provides communication between DAMES USVs and the base station. The radios on the USVs self-assemble into an ad-hoc mesh network. In this way, the entire sensor network can transmit sensor data to the base station without using satellite, Global System for Mobile communications (GSM), or other alternative communication channels.

Satellite Radio

Used for higher-level communication network for global coverage.

GPS

A GPS receiver located at the top of the mast provides position and velocity information and timing signals for sensor-measurement synchronization across all nodes in the DAMES fleet.

Weather Sensors

Assorted weather sensors for measurements such as temperature, humidity, pressure, and aerosol concentration are located on board the USV.

Balloon and Radiosonde Controller

A stand-alone module optionally contains the mechanism and controls to inflate and launch a radiosonde balloon.

Navigation and Propulsion Controller

Advanced autonomy algorithms provide station-keeping and waypoint-following behaviors to control the movement of the USV and the locations of the data sampling.

Thrusters

One or more, e.g., two, electric thrusters are located at the bottom of an underwater boom. The thruster(s) provides substantial and efficient mobility to the USV. In at least one embodiment, the thruster(s) is positioned to act as a keel, providing hydrodynamic stability to the USV.

Battery and Charge Controller

Custom-made, high-density lithium polymer (LiPo) batteries provide electrical power for the system. An integrated charge controller monitors battery levels and recharges them from solar panels and/or wind turbines, as available. The batteries alone provide up to two months of runtime with low thruster speeds; recharging can extend the runtime significantly further.

Solar Panel

A 100 watt (W) solar panel covers the top surface of the DAMES USV and is used to regenerate electricity and support long-term use of the vessel.

(CAS)

In addition to the standard light emitting diode (LED) light, the DAMES platform includes a standard automatic identification system (AIS) transceiver solution, as well as ultra-sonic or RF sensors installed at the front of the platform to detect cooperative traffic or other obstacles in the front field of view. A very low-cost radar sensor is a novel example of an RF sensor and its use by the team.

Figure 6A:
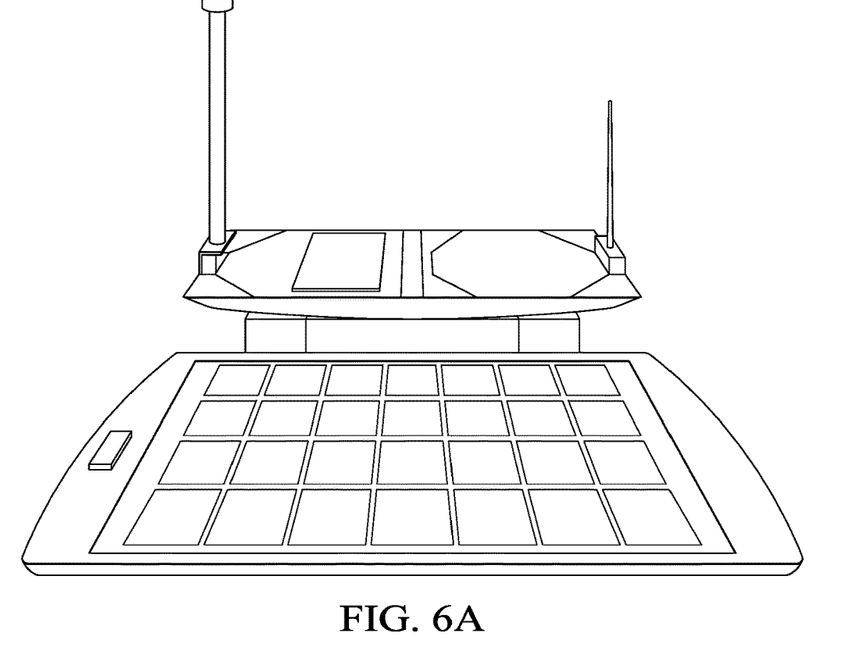
FIG. 6A is a photograph showing an embodiment of a USV of the present disclosure (left)
Figure 6B:
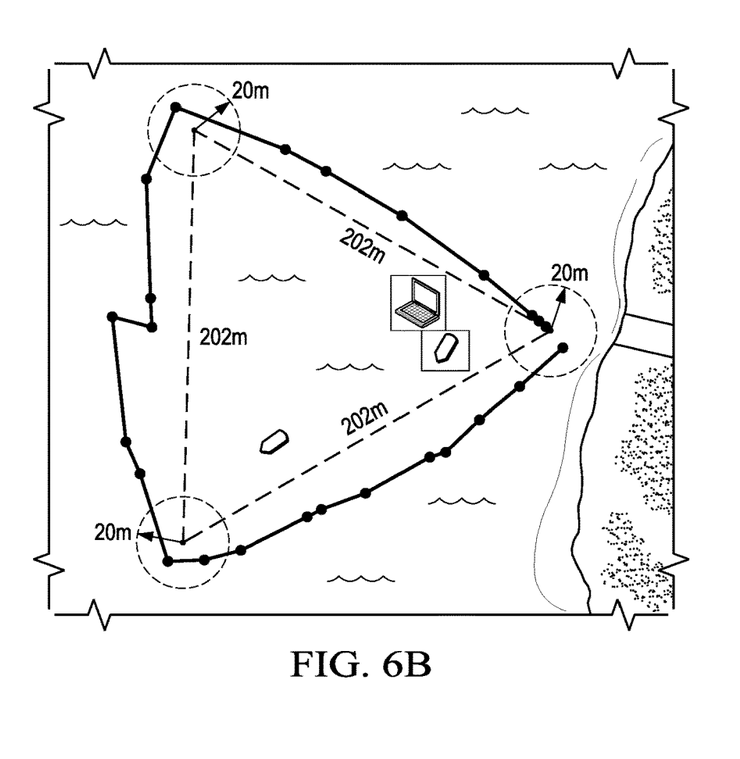
FIG. 6B is an example of a waypoint test using the USV for automatic navigation (right).

FIG. 6A shows a non-limiting prototype of a USV ("boat system"), which may be a monitoring node in FIG. 1, constructed in accordance with the present disclosure. The boat system is simple, light weight, and low cost. The hull body is made from rigid foam materials with a laminate coating, which provides strength to the overall structure. Solar panels, waterproof boxes containing the electronics, and weather sensors are mounted on the top side of the vessel. The components are mounted to the hull so that balance, stability, and floatation are preserved. The system uses 900 MHz radio for inter-boat networking and data communications. One aspect is the power charging and discharging cycle of the boat system, which is a balance among solar panel selection, platform size and propulsion power. The measured power cycle demonstrated that solar energy collected over 1-2 days can run the boat in constant full speed for about 15 hours. The actual power cycle will depend on the sunshine condition and actual platform speeds. In one embodiment, the computer unit is a 32-bit MCU based on Arm Cortex-M3 processor. The MCU controls and interfaces with all of the key system modules, including an AIRMAR weather sensor, other sensors, controllers, radio, battery, and propulsion system. The MCU can be programmed using the C programming language. The navigation routine uses GPS and a magnetic heading sensor to determine the vessel's current position and heading and plans a desired trajectory. Customized PID control is used for the thruster control, while more advanced distributed control schemes, which are used in other robotics control projects, can be added into the software system. The data routing protocol that allows data and control command from ground station to be transferred through "routing nodes" on another node is fully scalable and flexible, with implementations of information delivery algorithms described in previous sections. FIG. 6B is an example of a waypoint test using the USV for automatic navigation.

Figure 7:
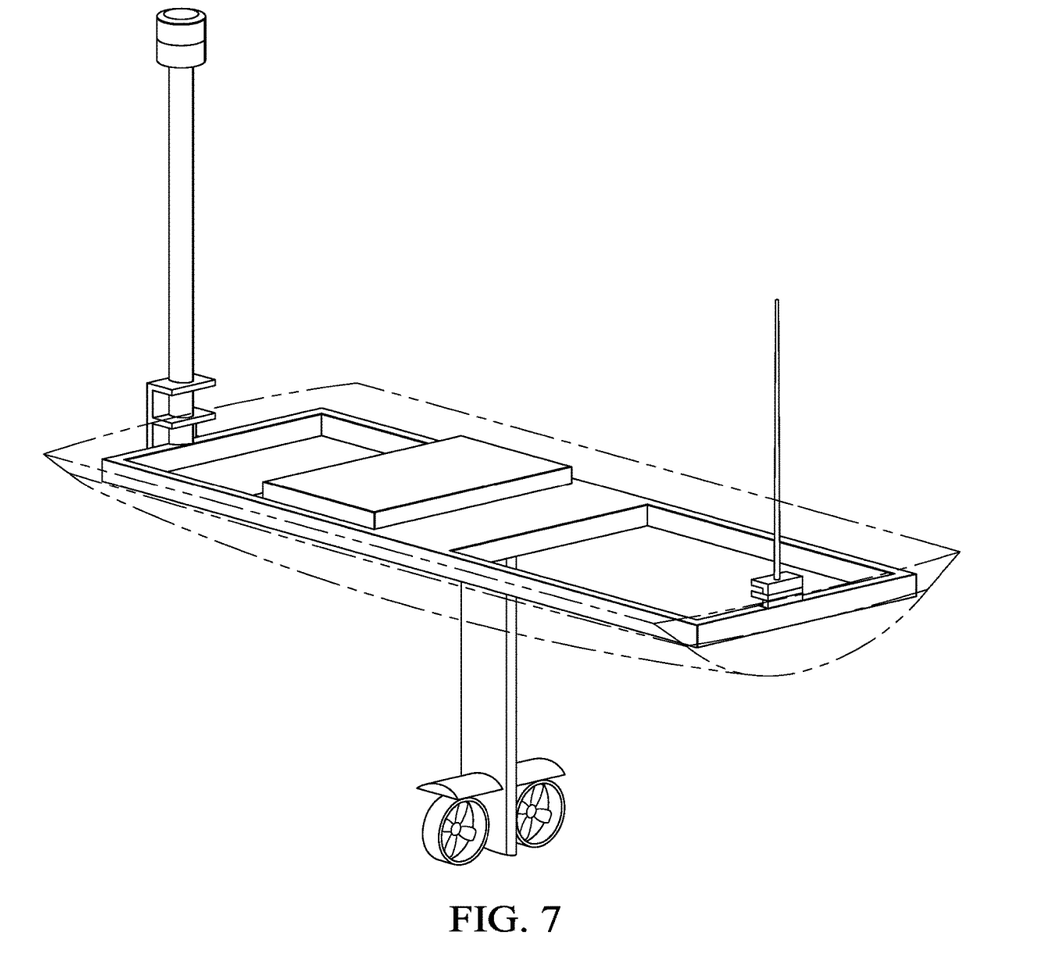
FIG. 7 is a cross-sectional schematic of several inner components of an exemplary USV of the present disclosure.
Figure 8:
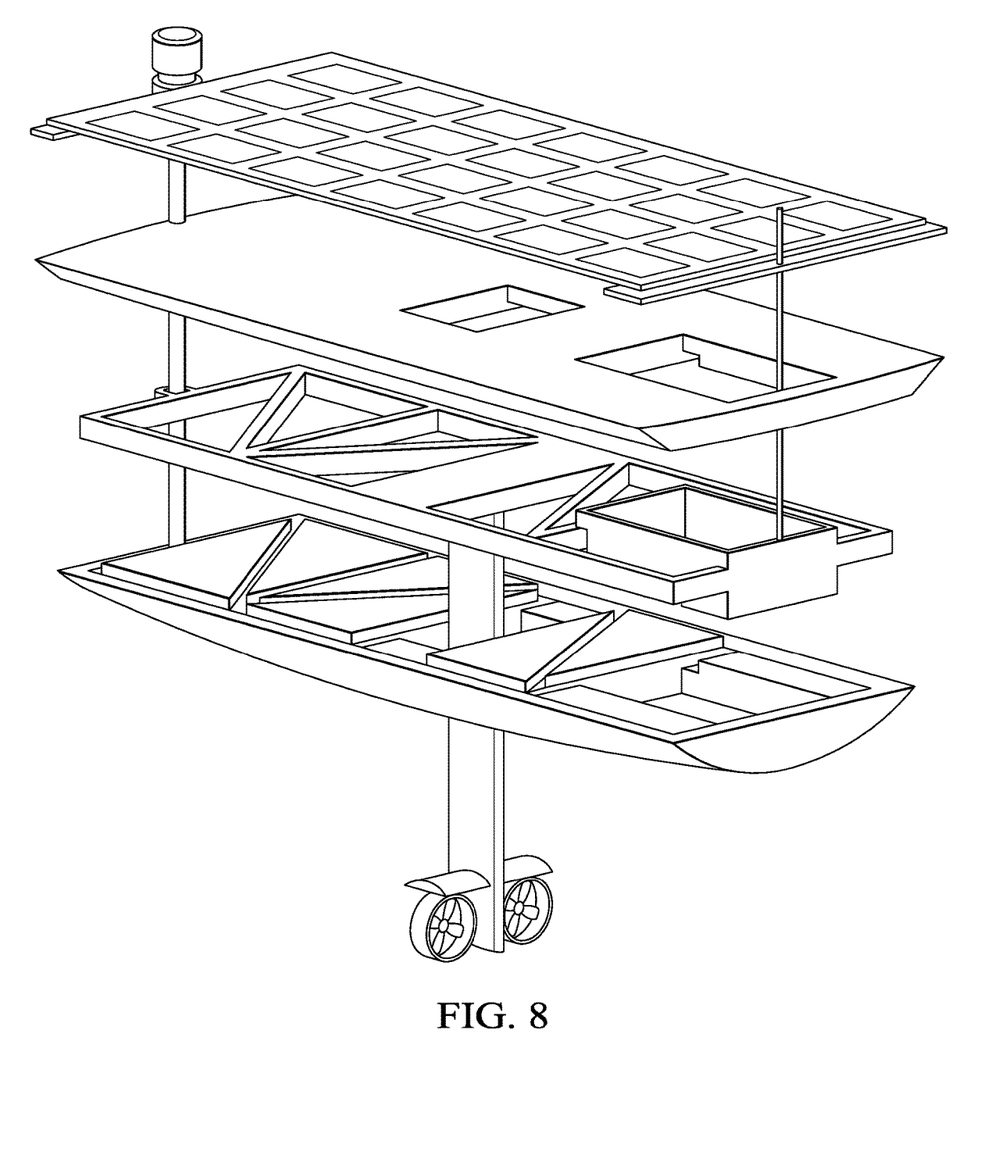
FIG. 8 is an exploded view of the USV of FIG. 7 showing several internal components.

The existing prototype of the USV design has been through three revisions and successful deep-lake tests have been performed in Oklahoma. The tests confirmed the basic functions of performance of the initial boat designs. The interior mechanical design of the DAMES-USV is shown in FIGS. 7 and 8. The shaping and structure design put less focus on the fluid dynamics efficiency, but more focus on the robustness, strength, and durability of the platform to handle harsh ocean environments.

Figure 9A:
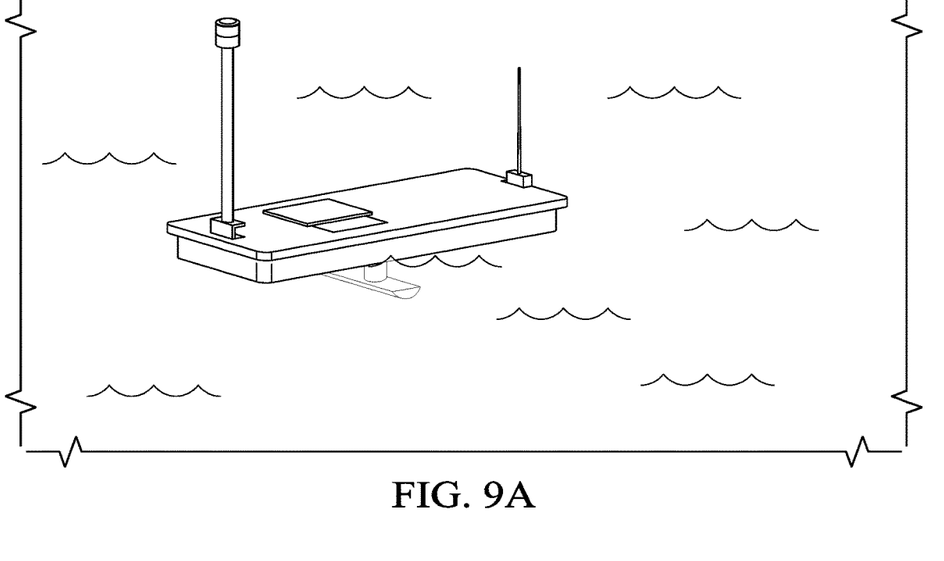
FIGS. 9A and 9B show photographs of two USV prototypes during a swimming pool test.
Figure 9B:
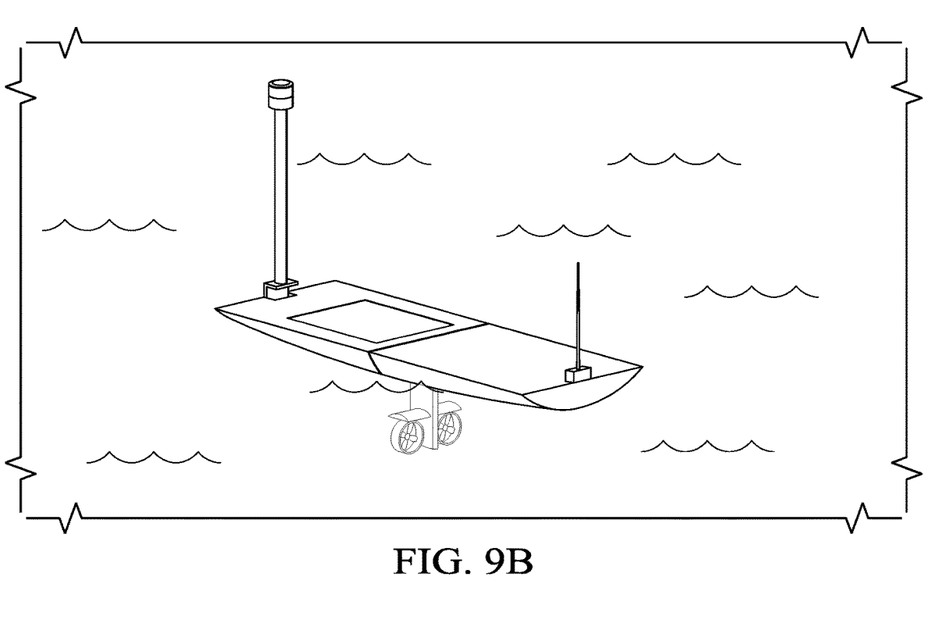

FIGS. 9A and 9B shows tests of prototype USV units in a swimming pool to determine the basic system structure balance and PID control tuning. The capability of autonomous environmental data collection, self-navigation and data communication in ocean environments was demonstrated.

Table 1 lists a brief summary of the DAMES system parameters in non-limiting embodiments.

TABLE 1

Summary of DAMES system parameters in exemplary embodiments

| System Parameters | Values |
| --- | --- |
| USV size and weight | 47 inch length, 24 inch width, 5 inch height, about 20 pounds (lbs) average. |
| Payload | ~80 lbs, including the solar panels, weather sensors, GPS and all electronics |
| System power consumption | 65 W at peak speed |
| USV cruising speed | 0.5-4 knots |
| Weather sensors | Humidity, temperature, wind speed/direction, pressure, radiosonde |
| Radiosonde | 406 MHz version with temperature, pressure, and humidity sensors. |
| Networking protocol | VHF radio with custom-designed protocols |
| Sampling rate | Single node 1 sample/second and network update rate depends on the data traffic |
| Network Scale | <65,535 nodes |
| Data rate | Network: <20 minutes, node-to-node: 10 kilobits per second (kbps) |
| Sustainability | 3 months continuously autonomous operation in ocean |
| Ocean worthiness | Beaufort Scale 4 |
| Autonomous navigation | GPS + inertial measurement unit (IMU) + Magnetic Compass + PID control |
| Cost | About average $5,000 based on node configurations, About $2,000 average for mass production |

Figure 10:
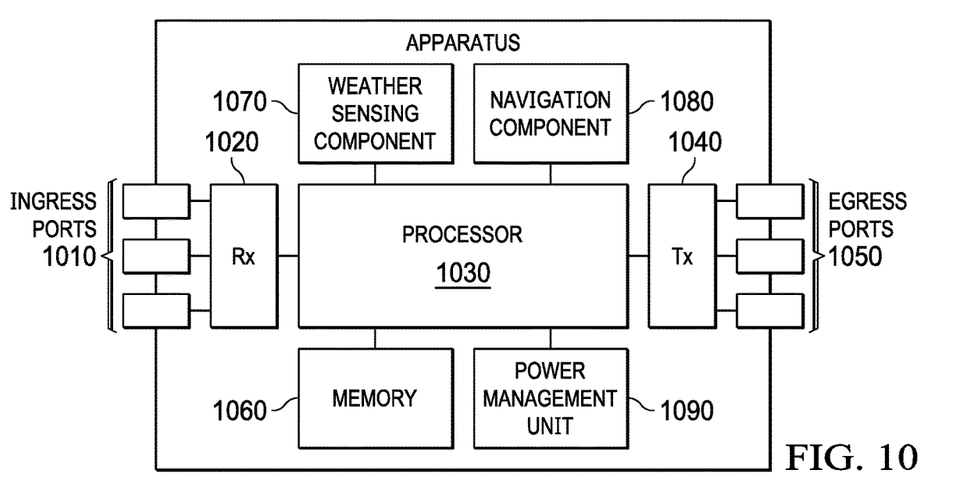
FIG. 10 is a schematic diagram of an apparatus according to an embodiment of the disclosure.

FIG. 10 is a schematic diagram of an apparatus 1000 according to an embodiment of the disclosure. The apparatus 1000 may implement the disclosed embodiments. The apparatus 1000 comprises ingress ports 1010 and a receiver unit (RX) 1020 for receiving data; a processor, logic unit, baseband unit, or central processing unit (CPU) 1030 to process the data; a transmitter unit (TX) 1040 and egress ports 1050 for transmitting the data; and a memory 1060 for storing the data. The apparatus 1000 may also comprise optical-to-electrical (OE) components, electrical-to-optical (EO) components, or RF components coupled to the ingress ports 1010, the RX 1020, the TX 1040, and the egress ports 1050 for ingress or egress of optical, electrical signals, or RF signals.

The processor 1030 is any combination of hardware, middleware, firmware, or software. The processor 1030 comprises any combination of one or more CPU chips, cores, or digital signal processors (DSPs). The processor 1030 communicates with the ingress ports 1010, the RX 1020, the TX 1040, the egress ports 1050, and the memory 1060. The processor 1030 comprises a weather sensing component 1070, which implements the disclosed embodiments. The inclusion of the weather sensing component 1070 therefore provides a substantial improvement to the functionality of the apparatus 1000 and effects a transformation of the apparatus 1000 to a different state. Alternatively, the memory 1060 stores the weather sensing component 1070 as instructions, and the processor 1030 executes those instructions. In addition, the apparatus comprises a navigation component 1080 and a power management unit 1090.

The memory 1060 comprises any combination of solid-state drives. The apparatus 1000 may use the memory 1060 as an over-flow data storage device to store programs when the apparatus 1000 selects those programs for execution and to store instructions and data that the apparatus 1000 reads during execution of those programs. The memory 1060 may be volatile or non-volatile and may be any combination of read-only memory (ROM), random-access memory (RAM), ternary content-addressable memory (TCAM), or static RAM (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of collecting meteorological data from an open water environment, the method comprising:
positioning a plurality of unmanned surface vehicles (USVs) in the open water environment, wherein each of the USVs comprises:
a buoyant hull structure configured to resist ultraviolet (UV) radiation and comprising:
an aluminum frame; and
an ethylene vinyl acetate (EVA) foam skin surrounding the aluminum frame;
a master computer unit (MCU) coupled to the buoyant hull structure;
a very high frequency (VHF) radio coupled to the buoyant hull structure;
a satellite radio coupled to the buoyant hull structure;
Global Positioning System (GPS) coupled to the buoyant hull structure;
a plurality of weather sensors coupled to the buoyant hull structure;
a navigation and propulsion controller coupled to the buoyant hull structure;
at least one thruster coupled to the buoyant hull structure and configured to provide propulsion;
a battery coupled to the buoyant hull structure;
a charge controller coupled to the buoyant hull structure; and a solar panel coupled to the buoyant hull structure and configured to charge the battery;

collecting the meteorological data with the USVs;

sending the meteorological data to a base station via a meshed communication network for analysis;

determining a needed sampling-region coverage and an ideal spatial resolution; and updating a sensor location grid of the USVs based on the needed sampling-region coverage to obtain the ideal spatial resolution.

2. The method of claim 1, further comprising performing, by the base station, a quality control of the meteorological data.

3. The method of claim 1, further comprising performing, by the base station, the analysis on the meteorological data.

4. The method of claim 1, further comprising displaying, by the base station, a graphical user interface (GUI) comprising the meteorological data on a satellite map.

5. The method of claim 1, further comprising displaying, by the base station, a graphical user interface (GUI) comprising locations of each of the USVs on a satellite map.

6. The method of claim 1, further comprising configuring, by the base station, network modes of the USVs using a graphical user interface (GUI).

7. The method of claim 1, further comprising communicating, by a graphical user interface (GUI) of the base station, with the USVs to collect the meteorological data at intervals of less than one second.

8. The method of claim 1, further comprising displaying, by the base station, a graphical user interface (GUI) comprising a date, a time, a current location of a first USV of the USVs, a system status of the first USV, a heading of the first USV, a wind direction associated with the first USV, a map, and graphs, wherein the map comprising a location of the first USV, and wherein the graphs are of a battery voltage, an air temperature, a wind speed, a relative humidity and a pressure from the first USV.

* * * * *